United States Patent
Yokoyama

[11] Patent Number: 5,751,560
[45] Date of Patent: May 12, 1998

[54] SWITCHING POWER CIRCUIT WITH CURRENT RESONANCE FOR ZERO CURRENT SWITCHING

[75] Inventor: Kenji Yokoyama, Shizuoka, Japan

[73] Assignee: Yamaha Corporation, Hamamatsu, Japan

[21] Appl. No.: 914,027

[22] Filed: Aug. 6, 1997

Related U.S. Application Data

[63] Continuation of Ser. No. 566,021, Dec. 1, 1995, abandoned.

[30] Foreign Application Priority Data

Dec. 12, 1994 [JP] Japan ................................. 6-332083

[51] Int. Cl.$^6$ ................................................. H02M 3/335
[52] U.S. Cl. ................................................. 363/18; 363/131
[58] Field of Search ........................... 363/15, 16, 17, 363/18, 19, 55, 95, 97, 131

[56] References Cited

U.S. PATENT DOCUMENTS

| | | | |
|---|---|---|---|
| 4,385,347 | 5/1983 | Takematsu | 363/49 |
| 5,383,106 | 1/1995 | Yoshida et al. | 363/15 |
| 5,412,555 | 5/1995 | Uramoto | 363/18 |
| 5,475,580 | 12/1995 | Noro | 363/24 |
| 5,515,256 | 5/1996 | Yokoyama | 363/18 |

OTHER PUBLICATIONS

K. Suzuki, Japanese Publ. No. 59-209068, Patent Abstracts of Japan, E-306, Apr. 4, 1985, vol. 9, No. 75.
S. Inagi, Japanese Publ. No. 1-234055, Patent Abstracts of Japan, E-860, Dec. 14, 1989, vol. 13, No. 564.
T. Oshikata, Japanese Publ. No. 2-87968, Patent Abstracts of Japan, E-941, Jun. 15, 1990, vol. 14, No. 278.

*Primary Examiner*—Adolf Berhane
*Attorney, Agent, or Firm*—Graham & James

[57] ABSTRACT

A transformer has a primary winding including a first end which is connected to a first input terminal. A switching transistor is connected between a second end of the primary winding and a second input terminal. Timing circuits control an on-off operation of the transistor while a rectifying and smoothing circuit provided on the secondary side of the transformer rectifies and smooths an output from the transformer. In the switching power circuit, a parallel circuit of a capacitor and an inductance element absorbs charges from the capacitor connected in series to the primary winding of the transformer, while a resonance capacitor connected between the collector and the emitter of the switching transistor forms a voltage resonance circuit with the main inductance of the primary winding of the transformer.

21 Claims, 3 Drawing Sheets

SWITCHING POWER CIRCUIT WITH CURRENT RESONANCE FOR ZERO CURRENT SWITCHING

This is a continuation of application Ser. No. 08/566,021 filed on Dec. 1, 1995 now abandoned.

BACKGROUND OF THE INVENTION

1. Field of the Invention

The present application relates to a power circuit of a switching inverter type. More particularly, the application is directed to a switching power circuit of a single-ended type which has a main switching transistor disposed on a primary side of a transformer.

2. Related Art

Conventional switching power circuits are known which are small in size, light in weight and high in operating efficiency. In this regard, there have been several methods proposed in which, for example, current resonance or voltage resonance is utilized to make the switching waveform sinusoidal, with noise reduction being achieved by a conductor with zero current and/or zero voltage.

In a switching power circuit according to one such method (hereinafter referred to as "a first method", when applicable), a resonance circuit is provided on the primary side of the transformer. The main switching elements of the circuit are push-pull type having two switching transistors which are connected to the primary winding of the transformer. A capacitor which forms a current resonance circuit with the leakage inductance of the primary winding is connected in series to the primary winding as disclosed in copending U.S. patent application Ser. No. 08/282,417 which application is incorporated herein by reference in its entirety.

In a switching power circuit according to another method (hereinafter referred to as "a second method", when applicable), a resonance circuit is provided on the secondary side of the transformer. In this circuit, the main switching element is a single-ended type having one switching transistor, and a resonance circuit is not provided on the primary side of the transformer. A current resonance circuit based on ripple is provided on the secondary side of the transformer as disclosed in U.S. Pat. No. 4,415,959.

In the circuit according to the first method, the two switching transistors are employed in a push-pull form because, when the current resonance capacitor is provided on the primary side of the transformer, it must be taken into account to absorb charges from the capacitor. A problem associated with the use of the two switching transistors, however, is an increased manufacturing cost.

In the circuit according to the second method, only one switching transistor is employed, and therefore the circuit is simple. In a switching power circuit, generally, the voltage on the primary side is higher than the voltage on the secondary side, and accordingly the current on the secondary side is larger than the current on the primary side thus resulting in a greater loss of electric power due to the greater resistance on the secondary side. Hence, the current resonance inductance element and capacitor, when provided on the secondary side, must have a much higher ripple withstanding capacity than when provided on the primary side. This results in a deterioration in operating efficiency and an increase in manufacturing cost.

SUMMARY OF THE INVENTION

In view of the foregoing difficulties accompanying the conventional switching pow e r circuits, an object of the present invention is to provide a switching power circuit which has a reduced manufacturing cost, reduced noise, and greater operating efficiency than a conventional switching power circuit.

The foregoing and other objects and advantages can be achieved by a switching power circuit which, according to one embodiment of the present invention, includes: a transformer having a primary winding including a first end connected to a first input terminal; a switching transistor connected between a second end of the primary winding and a second input terminal; a timing control circuit for controlling the on-off operation of the transistor; a rectifying and smoothing circuit provided on the secondary side of the transformer; a parallel circuit connected in series with the primary winding of the transformer, which comprises a capacitor forming a current resonance circuit with a leakage inductance of the transformer; and an inductance element for absorbing charges from the capacitor.

The switching power circuit of the invention may further employ a voltage resonance capacitor connected in parallel to the transistor which forms a voltage resonance circuit with the main inductance of the primary winding of the transformer.

In one embodiment of the switching power circuit of the invention, the main switching element is a singled-ended type having one switching transistor, and the current resonance circuit is formed on the primary side of the transformer. The capacitor forming the current resonance circuit on the primary side forms the parallel circuit with the inductance element which is adapted to absorb charges from the capacitor. Hence, although the main switching element is of a single-ended type, the current resonance operation is smoothly carried out. Accordingly, the circuit of the invention can be manufactured at a lower cost than the conventional circuit of the push-pull type. In addition, the parallel circuit made up of the capacitor and the inductance element on the primary side of the transformer may have a small ripple withstanding capacity because the current on the primary side is generally much smaller than the current on the secondary side. This feature contributes to a reduction in manufacturing cost and high operating efficiency of the switching power circuit of the invention.

DESCRIPTION OF THE PREFERRED EMBODIMENTS

A preferred embodiment of the present invention will now be described in detail with reference to the accompanying drawings. In this description, like reference numbers refer to like elements. It is to be understood that the present invention is in no way limited to the illustrated embodiment. The invention is solely limited by the claims appended hereto.

Figure 1:
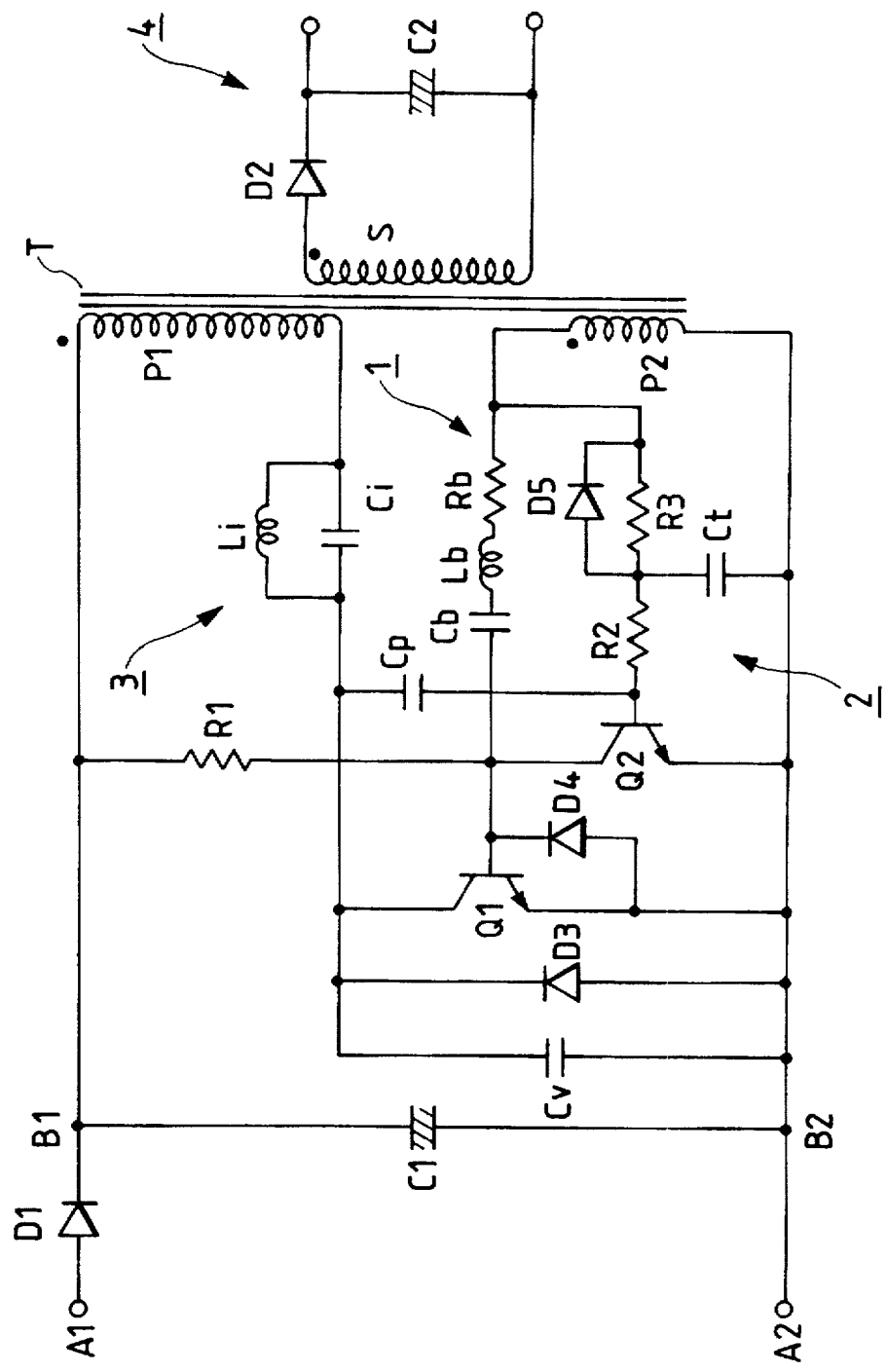
FIG. 1 is a circuit diagram showing the arrangement of a switching power circuit in accordance with a preferred embodiment of the invention.

Referring to FIG. 1, input terminals A1 and A2 are connected, for instance, to a commercial AC power source.

A rectifier circuit including a diode D1 and a capacitor C1 is connected between the input terminals A1 and A2. The output terminals of the rectifier circuit are identified as DC power terminals B1 and B2. A series circuit of the primary winding P1 of a transformer T and a main switching transistor, namely, an NPN transistor Q1 is connected between the DC power terminals B1 and B2. A starting resistor R1 is connected between the base of the transistor Q1 and the power terminal B1 to turn on the transistor Q1 when the power switch is actuated.

An "on" timing circuit 1 is connected between one terminal of the auxiliary winding P2 of the transformer T and the base of the transistor Q1, which functions to turn on and off the transistor Q1 with a predetermined period by using the output of the auxiliary winding P2. The "on" timing circuit 1 includes an inductance element Lb, a resistor Rb, and a DC blocking capacitor Cb. An NPN transistor Q2 is connected between the base and the emitter of the transistor Q1 to turn off the transistor Q1.

On the other hand, an "off" timing circuit 2 is connected between the base of the transistor Q2 and the terminals of the auxiliary winding P2 of the transformer T. The "off" timing circuit 2 is a time constant circuit including resistors R2 and R3 and a capacitor Ct. The resistor R3 is shunted by a diode D5, to discharge the capacitor Ct.

An LC parallel circuit 3, which is a parallel circuit of a capacitor Ci and an inductance element Li, is connected between the primary winding P1 of the transformer T and the collector of the transistor Q1. The capacitor Ci of the LC parallel circuit 3 and the leakage inductance of the transformer T form a current resonance circuit. The inductance element Li is provided to absorb the charge, after the transistor Q1 is turned off, which has been stored in the capacitor Ci by the current resonance operation.

The value of the capacitor Ci of the LC parallel circuit 3 is determined according to the leakage inductance (approximately 10 μH) of the transformer T so that a predetermined resonance frequency is obtained. The value of the inductance element Li should be determined so that the resonance frequency fi of the parallel circuit 3 meets the following condition:

$$fm \geq fi,$$

where fm is the switching frequency of the transistor Q1. In addition, acceptable results are obtained when the following relationship is met:

$$fi = fm/2.$$

A capacitor Cv is connected between the collector and the emitter of the transistor Q1. The capacitor Cv forms a voltage resonance circuit with the main inductance of the primary winding P1 of the transformer T. The value of the capacitor Cv is determined according to the main inductance (approximately 2 mH) of the primary winding P1 so that a predetermined resonance frequency is obtained. The leakage inductance is much smaller than the main inductance of the primary winding, and therefore the value of the current resonance capacitor Ci is much larger than that of the voltage resonance capacitor Cv. Hence, the voltage resonance operation is substantially not affected by the connection of the current resonance capacitor Ci.

A capacitor Cp is connected between the collector of the transistor Q1 and the base of the transistor Q2. The capacitor Cp is a positive feedback capacitor which, when the transistor Q1 is turned on, applies a negative bias to the base of the transistor Q2 thus accelerating the turn-off operation of the transistor Q1.

An excessive-voltage protective diode D3 for the transistor Q1 is connected between the collector and the emitter of the transistor Q1. However, the diode D3 may be omitted where a transistor having a predetermined rating is employed as Q1. Another excessive-voltage protective diode D4 is connected between the base and the emitter of the transistor Q1 for preventing the capacitor Cb from being clamped due to the diode characteristics between the base and the emitter of the transistor Q1. On the secondary side of the transformer T, a rectifying and smoothing circuit 4 is made up of a diode D2 and a capacitor C2.

In the above-described power circuit, a DC voltage applied across the terminals B1 and B2 is converted into an AC voltage by the on-off operation of the switching transistor Q1 which is carried out with a predetermined period being controlled by the timing circuits 1 and 2. The AC voltage is applied to the transformer T, so that, on the secondary side of the transformer T, it is converted into a predetermined DC voltage by the rectifying and smoothing circuit 4.

In this switching inverter operation, while the transistor Q1 is held conductive (on), the resonance current of the current resonance circuit of the capacitor Ci flows in the circuit. In this connection, the value of the capacitor Ct is selected so that, before the transistor Q1 is turned off, the resonance current is zeroed. Hence, when the transistor Q1 is turned to the off state, the collector current is substantially zero. In other words, a zero-current-"off"-operation is performed. This current resonance operation makes the current waveform accurately sinusoidal, so that the switching operation is low in noise and loss because the voltage applied to the switching element does not overlap the current flowing therein.

On the other hand, while the transistor Q1 is in the off state, the resonance current of the voltage resonance circuit of the capacitor Cv flows in the circuit. In this connection, the resonance frequency is selected such that, when the transistor Q1 is to transition to an "on" state, the resonance voltage is zeroed. Because of this voltage resonance operation, the transistor Q1 is turned on with the collector-emitter voltage being substantially zero. In other words, a zero-voltage-"on"-operation is performed. Accordingly, the voltage waveform is also accurately sinusoidal, so that the switching operation is low in noise and loss because there exists no overlapping of the leading time of the voltage in a similar manner as the current discussed above.

In the above-described current resonance operation, the charge stored in the capacitor Ci while the transistor Q1 is held conductive (on), is absorbed by the inductance element Li, which shunts capacitor Ci, when the transistor Q1 is turned off. In this connection, with respect to the switching frequency fm of the transistor Q1 the resonance frequency fi of the resonance circuit constituted by the capacitor Ci and the inductance element Li is determined in the above-described manner, so that the absorption of the charge from the capacitor Ci is achieved without adversely affecting the current resonance operation.

Figure 2:
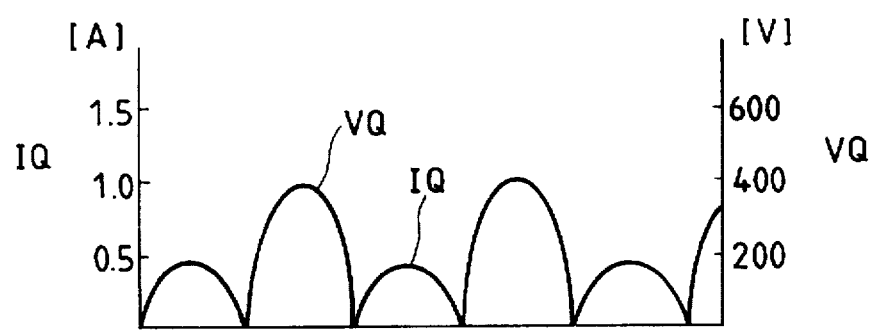
FIG. 2 is a waveform diagram showing the current and voltage of a transistor in the switching power circuit shown in FIG. 1.

FIG. 2 is a waveform diagram showing the collector-emitter voltage VQ and the collector current IQ of the transistor Q1 in the power circuit according to the invention. As is seen from FIG. 2, the zero-current "off" operation on the current resonance, and the zero-voltage "on" operation on the voltage resonance, permit a low-loss switching operation based on a sinusoidal waveform.

According to the present invention, the main switching element is a single-ended type, having only one transistor Q1. Hence, the circuit is simple when compared with that in which the main switching element is of the push-pull type. The parallel circuit 3 formed with the current resonance capacitor Ci and the inductance element is provided on the primary side of the transformer T where current is small. Hence, the capacitor Ci and the inductance element Li may be small in current capacity, which contributes to a reduction in loss and manufacturing cost.

Figure 3:
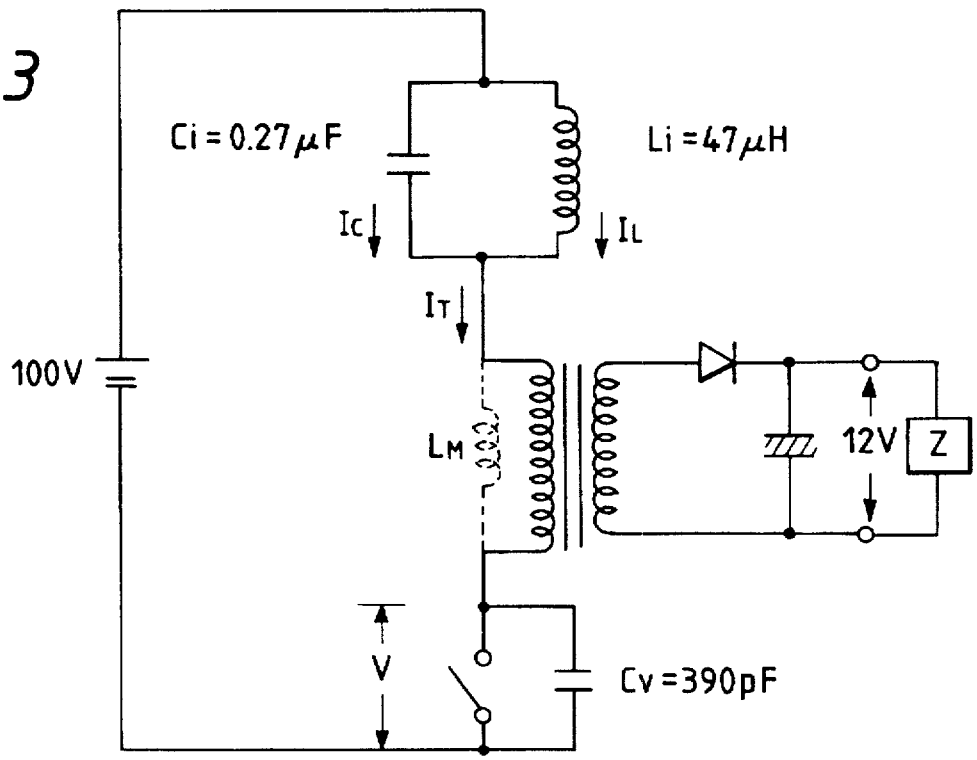
FIG. 3 is a circuit diagram showing a test circuit which utilizes several circuit elements of the switching power circuit shown in FIG. 1.
Figure 4A:
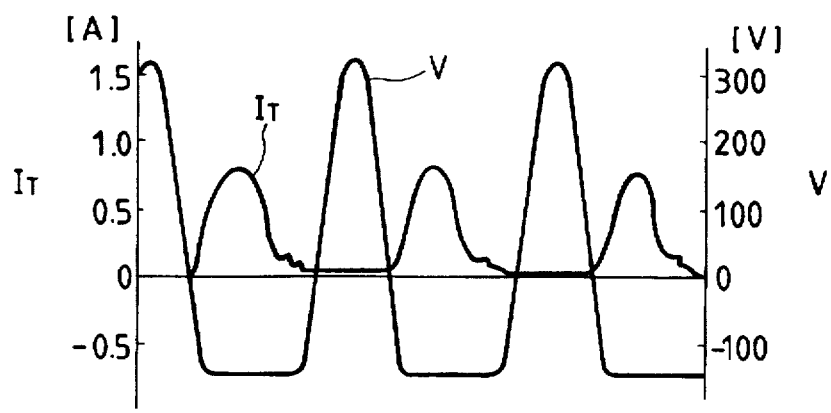
FIGS. 4A, 4B and 4C are diagrams showing operating waveforms in the test circuit shown in FIG. 3.
Figure 4B:
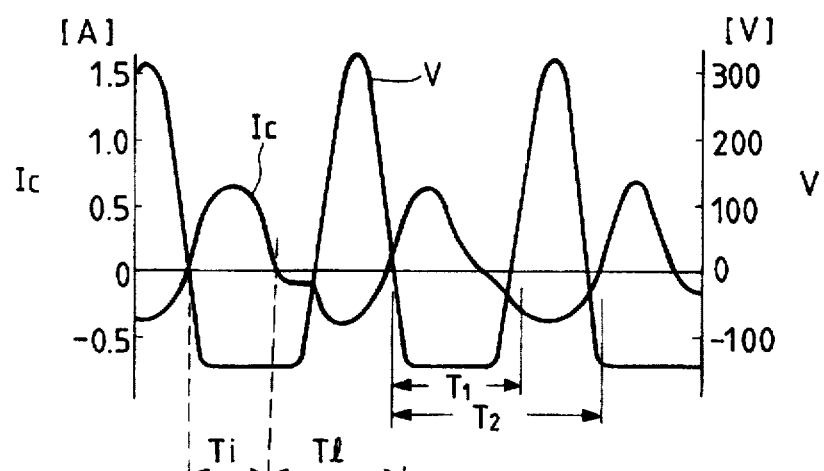
Figure 4C:
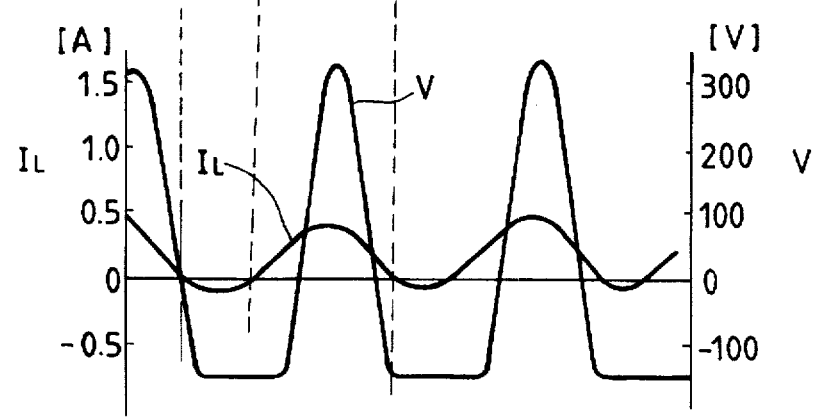

FIG. 3 shows an experimental test circuit including circuit elements of the embodiment shown in FIG. "1," while FIGS. 4A, 4B and 4C show the waveforms of currents and voltages measured using the experimental circuit. In the experimental circuit, the current resonance capacitor Ci is 0.27 µF, the inductance element Li shunted by Ci is 47 µH, and the voltage resonance capacitor Cv is 390 pF. In FIG. 4C, the current $I_L$ flowing in the inductance element Li is the discharge current of the capacitor Ci. In FIG. 4B, reference character $T_1$ designates the period which is obtained from the following equation:

$$T_1 = 1/fm$$

where fm is the resonance frequency of the current resonance circuit which is made up of the capacitor Ci and a leakage inductance LM. Further in FIG. 4B, reference character $T_2$ designates the period which is determined from the resonance frequency of the whole circuit including the inductance element Li.

As shown in FIGS. 4B and 4C, most of the current (energy) $I_T$ accumulated in the primary side of the transformer is equal to the current $I_C$ flowing in the capacitor Cd when the switching power circuit is in the ON state. When the resonant current flow during a constant time period Ti is terminated, the current $I_L$ starts to flow, as shown in FIG. 4C, to discharge the capacitor C1 owing to the inductance element Li. On the other hand, during the time period Tl until the next turning-on timing of the switching power circuit, the charge accumulated in the capacitor C1 is completely discharged. Afterwards, the switching power circuit turns again to the initial state where the current $I_T$ flows in the primary side of the transformer, and the same oscillation procedure is repeated.

As described above, in the switching power circuit of the present invention, the current resonance circuit is formed, as a single-ended type switching inverter, on the primary side of the transformer, and the charge absorbing inductance element is connected in parallel to the current resonance capacitor. Hence, the switching power circuit of the invention is low in noise, improved in efficiency, and can be manufactured at a reduced cost when compared with conventional switching power circuits.

What is claimed is:

1. A switching power circuit comprising:
   first and second input terminals;
   a transformer including a primary winding having a first end which connects to said first input terminal;
   a switching transistor connected between a second end of the primary winding of said transformer and said second input terminal;
   timing control means for controlling an on-off operation of said switching transistor;
   rectifying and smoothing means connected on a secondary winding of said transformer for rectifying and smoothing an output from said secondary winding; and
   a current resonance circuit connected in series with the primary winding of said transformer and said switching transistor, said current resonance circuit being determined in accordance with a leakage inductance of said transformer.

2. The switching power circuit of claim 1, further comprising a voltage resonance circuit connected in parallel with said switching transistor.

3. The switching power circuit of claim 1, wherein said current resonance circuit comprises a parallel circuit including a capacitor and an inductor for absorbing charges from said capacitor.

4. The switching power circuit of claim 2, wherein said voltage resonance circuit comprises a resonance capacitor.

5. The switching power circuit of claim 1, wherein said switching transistor comprises an NPN transistor.

6. The switching power circuit of claim 1, wherein said timing control means comprises an "on" timing circuit connected between a first terminal of an auxiliary winding of said transformer and a base of said switching transistor, said "on" timing circuit turning on and off said switching transistor with a predetermined period in accordance with an output of the auxiliary winding of said transformer.

7. The switching power circuit of claim 6, wherein said "on" timing circuit comprises an inductance element, a resistor, and a DC blocking capacitor.

8. The switching power circuit of claim 1, wherein said timing control means comprises an "off" timing circuit connected between a base of said switching transistor and first and second terminals of an auxiliary winding of said transformer.

9. The switching power circuit of claim 8, wherein said "off" timing circuit comprises a time constant circuit including a plurality of resistors and a capacitor.

10. The switching power circuit of claim 9, further comprising a diode for shunting one of said plurality of resistors of said "off" timing circuit to enable a discharge of said capacitor.

11. The switching power circuit of claim 1, further comprising turning off means, connected between a base and an emitter of said switching transistor, for turning off said switching transistor.

12. The switching power circuit of claim 11, wherein said turning off means comprises an NPN transistor.

13. The switching power circuit of claim 12, further comprising a first excessive-voltage protective diode connected between a collector and said emitter of said switching transistor.

14. The switching power circuit of claim 13, further comprising a second excessive-voltage protective diode connected between said base and said emitter of said switching transistor.

15. The switching power circuit of claim 12, further comprising a feedback capacitor connecting between the collector of said switching transistor and a base of said turning-off transistor.

16. The switching power circuit of claim 3, wherein a value of said capacitor of said parallel circuit is determined in accordance with said leakage inductance of said transformer.

17. The switching power circuit of claim 4, wherein a value of said resonance capacitor of said voltage resonance circuit is determined in accordance with a main inductance of the primary winding of said transformer.

18. The switching power circuit of claim 1, wherein said resonance circuit includes a resonance current, said resonance current being determined such that, when said switching transistor is turned to an off state, the resonance current is zeroed.

19. The switching power circuit of claim 2, wherein said voltage resonance circuit includes a resonance voltage said resonance voltage being determined such that, when said switching transistor is turned to an on state, said resonance voltage is zeroed.

20. A switching power circuit comprising:

first and second input terminals;

a transformer including a primary winding having a first end which connects to said first input terminal;

a switching transistor connected between a second end of the primary winding of said transformer and said second input terminal;

timing control means for controlling an on-off operation of said switching transistor;

rectifying and smoothing means connected on a secondary winding of said transformer for rectifying and smoothing an output from said secondary winding; and a current resonance circuit connected in series with the primary winding of said transformer, said current resonance circuit being determined in accordance with a leakage inductance of said transformer, wherein said current resonance circuit comprises a parallel circuit including a capacitor and an inductor for absorbing charges from said capacitor, and a value of said capacitor of said parallel circuit is determined in accordance with said leakage inductance of said transformer, wherein a value of said inductor of said parallel circuit is determined such that:

$$fm \geq fi,$$

wherein fm is a switching frequency of said switching transistor and fi is a resonance frequency of such parallel circuit.

21. The switching power circuit of claim 20, wherein said resonance frequency fi of said parallel circuit and said switching frequency fm of said switching transistor are related as follows:

$$fi = fm/2.$$

* * * * *